United States Patent
Tononishi

(10) Patent No.: US 7,935,441 B2
(45) Date of Patent: May 3, 2011

(54) BATTERY PACK

(75) Inventor: Masamitsu Tononishi, Kyoto (JP)

(73) Assignees: Sanyo Electric Co., Ltd., Moriguchi-shi (JP); Sanyo GS Soft Energy Co., Ltd., Kyoto-shi (JP)

( * ) Notice: Subject to any disclaimer, the term of this patent is extended or adjusted under 35 U.S.C. 154(b) by 1095 days.

(21) Appl. No.: 11/712,896

(22) Filed: Mar. 2, 2007

(65) Prior Publication Data

US 2007/0207380 A1    Sep. 6, 2007

(30) Foreign Application Priority Data

Mar. 3, 2006  (JP) ................. 2006-058207

(51) Int. Cl.
   *H01M 2/02*  (2006.01)
   *H01M 2/10*  (2006.01)
(52) U.S. Cl. ......... 429/179; 429/100; 429/163; 429/175
(58) Field of Classification Search ............... D13/103, D13/119
   See application file for complete search history.

(56) References Cited

U.S. PATENT DOCUMENTS

| | | | | |
|---|---|---|---|---|
| 6,137,259 A | 10/2000 | Hirabayashi et al. | ......... | 320/107 |
| 2004/0095093 A1 | 5/2004 | Baba et al. | ......... | 320/112 |
| 2004/0142239 A1 * | 7/2004 | Morita et al. | ......... | 429/181 |

FOREIGN PATENT DOCUMENTS

| | | |
|---|---|---|
| CN | 1253391 A | 5/2000 |
| CN | 1485946 A | 3/2004 |
| JP | 2001-6636 | 1/2001 |
| JP | 2003-229105 | 8/2003 |
| JP | 2004-6085 | 1/2004 |
| JP | 2004-327378 | 11/2004 |
| JP | 2005-100689 | 4/2005 |
| JP | 2005-135770 | 5/2005 |
| JP | 2005-158452 | 6/2005 |
| JP | 2005-190852 | 7/2005 |
| JP | 2005-190956 | 7/2005 |
| JP | 2006-164559 | 6/2006 |

OTHER PUBLICATIONS

Chinese Office Action dated Aug. 21, 2009 issued in corresponding Chinese Patent Application No. 200710085099.X with English translation and Certification.

* cited by examiner

*Primary Examiner* — Robert Hodge
(74) *Attorney, Agent, or Firm* — Kratz, Quintos & Hanson, LLP

(57) ABSTRACT

A case is made by disposing side plate portions on the long side and a side plate portion on one short side on the circumference of a plate portion. Provided on the other short side of the case in two tiers are a side plate portion and a substrate casing portion which has a height lower than the side plate portion. The substrate casing portion has a lower plate portion, side plate portions and an upper plate portion. The lower plate portion is provided with window portions from which the respective output terminals are exposed. The battery assembly is held in the case by fitting the protection circuit substrate which is laid down on a side face, into the substrate casing portion.

13 Claims, 13 Drawing Sheets

BATTERY PACK

CROSS-REFERENCE TO RELATED APPLICATIONS

This Nonprovisional application claims priority under 35 U.S.C. §119(a) on Patent Application No. 2006-58207 filed in Japan on Mar. 3, 2006, the entire contents of which are hereby incorporated by reference.

BACKGROUND OF THE INVENTION

1. Field of the Invention

The present invention relates to a battery pack wherein a nonaqueous electrolyte secondary battery capable of charge and discharge, or a lithium-ion secondary battery or the like in particular, to be used as the power supply mainly for a portable electronic device such as a video camera, a mobile computer or a mobile telephone is held in an insulating case.

2. Description of Related Art

In recent years, a nonaqueous electrolyte secondary battery, such as a lithium-ion secondary battery, which is capable of charge and discharge and has the shape of a rectangular parallelepiped is mainly used as the power supply for a portable electronic device, such as a video camera, a mobile computer or a mobile telephone, which is spreading rapidly.

A battery assembly is obtained by disposing a protection circuit substrate for controlling the voltage of a cell at one side face of a lithium-ion secondary battery (cell) in order to prevent overcharge and overdischarge. A battery pack obtained by housing the battery assembly in an insulating case, made of synthetic resin for example, is mounted in an electronic device. The protection circuit substrate and the cell are electrically connected with each other by a lead plate for connection.

Disclosed in Japanese Patent Application Laid-Open No. 2005-190852 is an invention of a battery pack assembled by holding a cell in an upper case and a lower case, which are prepared by splitting a case parallel to a flat surface portion of a battery assembly having the shape of a square flat plate into an upper part and a lower part and respectively have the shape of a box of one surface opening, and then joining the cases by a method such as ultrasonic welding.

FIG. 1 is an exploded perspective view showing the same battery pack as that of Japanese Patent Application Laid-Open No. 2005-190852, and denoted at 61 in the figure is a battery pack.

A cell 62a of a battery assembly 62 of the battery pack 61 is a nonaqueous electrolyte secondary battery, such as a lithium-ion secondary battery, having the shape of a square flat plate, which is made by holding electrode assembly having a positive electrode and a negative electrode wound via a separator and nonaqueous electrolyte in a case made of aluminum or aluminum alloy.

The battery assembly 62 is constructed by laying down a protection circuit substrate 62b on one end face of the cell 62a. The top face of the protection circuit substrate 62b is provided with protection circuits 62c and 62c for preventing overcharge, overdischarge or the like and is connected with a positive electrode plate and a negative electrode plate (not illustrated) to be electrically connected with the cell 62a. Output terminals 62d, 62d and 62d for taking out electric power to the outside as well as taking in electric power from the outside for charge are provided at the rear face of the protection circuit substrate 62b in a form of gold plating.

A lower case 63 of the case is made by disposing side plate portions 63b and 63b on the long side and side plate portions 63c and 63c on the short side on the circumference of a flat plate portion 63a. The flat plate portion 63a is provided with window portions 63d, 63d and 63d from which the output terminals 62d, 62d and 62d are exposed.

Side plate portions 64b and 64b on the long side and a side plate portion 64c on one short side are disposed on the circumference of a flat plate portion 64a of an upper case 64. Provided on the other short side of the upper case 64 in two tiers are: a side plate portion 64h; and a substrate covering portion 64d comprising an upper plate portion 64e and side plate portions 64f, 64g and 64g.

The battery pack 61 is assembled by holding the battery assembly 62 in the lower case 63, then covering the assembly with the upper case 64 and joining the upper case 64 and the lower case 63 by ultrasonic welding.

Disclosed in Japanese Patent Application Laid-Open No. 2005-190956 is an invention of a battery pack constructed by assembling an upper case and a lower frame, which is made to have the shape of a window frame by providing an opening at a closed-end face of a case, and then wrapping a label around the assembly.

Disclosed in Japanese Patent Application Laid-Open No. 2005-100689 is an invention of a battery pack constructed by assembling an upper frame and a lower frame, which are respectively made to have the shape of a frame by providing an opening at a closed-end face of an upper case and a lower case, and then wrapping a label around the assembly.

FIG. 2 is an exploded perspective view showing the same battery pack as that of Japanese Patent Application Laid-Open No. 2005-100689, and denoted at 71 in the figure is a battery pack.

A battery assembly 72 is constructed by laying down a protection circuit substrate 72b on one end face of a cell 72a. The top face of the protection circuit substrate 72b is provided with protection circuits 72c and 72c for preventing overcharge, overdischarge or the like and is connected with a positive electrode plate and a negative electrode plate (not illustrated) to be electrically connected with the cell 72a. Output terminals 72d, 72d and 72d are provided at the rear face of the protection circuit substrate 72b in a form of gold planting.

A lower frame 73 of the outer frame is made by disposing side plate portions 73b and 73b on the long side and a side plate portion 73c on one short side on the circumference of a bottom plate portion 73a having the shape of a window frame. Provided on the other short side of the lower frame 73 is a substrate placing portion 73d comprising a bottom plate portion 73e and side plate portions 73f, 73g and 73g. The bottom plate portion 73e is provided with window portions 73h, 73h and 73h from which the output terminals 72d, 72d and 72d are exposed.

An upper frame 74 is made by disposing side plate portions 74b and 74b on the long side and a side plate portion 74c on one short side on the circumference of an upper plate portion 74a having the shape of a window frame. Provided on the other short side of the upper frame 74 in two tiers are: a side plate portion 74h; and a substrate covering portion 74d comprising an upper plate portion 74e and side plate portions 74f, 74g and 74g.

The battery pack 71 is assembled by holding the battery assembly 72 in the lower frame 73, then covering the assembly with the upper frame 74 and joining the upper frame 74 and the lower frame 73 by ultrasonic welding.

A label 75 is then wrapped to cover both of the exposed faces of the battery assembly 72, the side plate portions 74b and 74b of the upper frame 73 and the side plate portions 73b and 73b of the lower frame 73. The label 75 is doubly wrapped at the rear face side of the battery assembly 72.

Disclosed in Japanese Patent Application Laid-Open No. 2005-135770 is an invention of a battery pack constructed by fitting a right frame and a left frame, which are U-shaped by splitting an outer frame for covering side faces of a battery assembly in a direction perpendicular to a flat surface of the battery assembly into a right part and a left part, to the battery assembly and then wrapping a label around the assembly.

Disclosed in Japanese Patent Application Laid-Open Nos. 2004-327378 and 2005-158452 are inventions of battery packs constructed by uniting an upper frame and a lower frame of an outer frame, which have the shape of a window frame, to cover side faces of a battery assembly or uniting a right frame and a left frame of an outer frame, which are U-shaped, to cover side faces of a battery assembly, and then wrapping a label around the assembly.

Disclosed in Japanese Patent Application Laid-Open No. 2003-229105 is an invention of a battery pack constructed by forming a connection circuit peripheral portion by insert molding with low-temperature molding resin and then attaching or wrapping a label, without using a case.

Disclosed in Japanese Patent Application Laid-Open No. 2006-164559 is an invention of a battery pack comprising a case made by: forming a rectangular frame member surrounding the outer periphery of a battery assembly which is provided with a protection circuit substrate at one end face of a cell, in an integrated manner with a rectangular plate for covering a lower face of the battery assembly to make a frame member at one end face side to be a connecting frame from which output terminals are exposed; and providing a fitting portion into which the protection circuit substrate is fitted, at the connecting frame.

With the battery packs in Japanese Patent Application Laid-Open Nos. 2005-190852, 2005-190956, 2005-100689 and 2005-135770 wherein two cases or outer frames are assembled, there is a problem that the accuracy of dimension of a battery pack is the cumulative amount of the accuracy of dimension of the respective cases or outer frames and enhancement of the accuracy of dimension has a limitation. Moreover, assembling of a battery pack is cumbersome. Furthermore, methods for assembling two cases or outer frames, such as ultrasonic welding, adhesion and fitting using a locking claw, respectively have the following problems.

Ultrasonic welding has a drawback that expensive facilities and special jigs are required and the initial cost for starting commercial production is high. There is also a problem that it is necessary to provide predetermined clearance between a flat plate side of an upper case and a battery assembly so that the ultrasonic energy is not applied directly to a cell and electronic components on a connection circuit since direct application of ultrasonic energy sometimes damage components, and thickness reduction of a battery pack has a limitation.

Adhesion using instant adhesive has a drawback that whitening by the action of desiccant added to adhesive causes a defective appearance. Adhesion using other adhesive has a drawback that hardening takes time and much man-hour is required. There is also a problem that adhesive is likely to get out of adhesive surface, causing a defective appearance.

Fitting using a locking claw has a problem that it is difficult to strengthen fitting so as to prevent breakup at the time of fall or disassembly by a user. Accordingly, fitting using a locking claw is not used alone for assembling but is used mainly as auxiliary fitting to be used before label attachment for a battery pack of a label wrapping type.

With battery packs in Japanese Patent Application Laid-Open Nos. 2005-190956, 2005-100689, 2005-135770, 2004-327378, 2005-158452 and 2003-229105 which are constructed by wrapping a label on whole circumference of a battery assembly, it is necessary to provide a double or triple superposition portion at the end sides of a label in order to prevent the surface of the battery assembly from being exposed to the outside. When the superposition portion is provided, there is a problem that a step is generated around the superposition portion, degrading the appearance of the battery pack.

In the invention in Japanese Patent Application Laid-Open No. 2006-164559 wherein a battery assembly is fitted into a case formed in an integrated manner to have the shape of a box, it is possible to retain output terminals of the battery assembly at fixed positions of the case simply and easily.

The technical advance of thickness reduction has made it possible to realize a cell having a thickness of approximately 3 mm, and it is contemplated that thickness reduction of a battery pack further progresses by using such a cell. For this purpose, it is necessary to reduce the thickness of the entire battery assembly provided with a protection circuit substrate. When the thickness of a cell is reduced as described above, however, there is a problem that the vertical dimension of a protection circuit substrate, which is stood at a side face of the cell, becomes too short and it becomes impossible to mount IC, FET and various kinds of electronic components constituting the protection circuit and to provide output terminals. That is, a battery pack wherein a protection circuit substrate is stood has a problem that thickness reduction has a limitation and the invention in Japanese Patent Application Laid-Open No. 2006-164559, which is a battery pack wherein a protection circuit substrate is stood, has a limitation in thickness reduction.

BRIEF SUMMARY OF THE INVENTION

The present invention has been made with the aim of solving the above problems, and it is an object of the present invention to provide a battery pack with which preferable accuracy of dimension can be obtained and assembling can be achieved easily since a case is constructed by providing a substrate casing portion in which a protection circuit substrate is laid down, in an extension to one side plate portion of a box member having side plate portions on the circumference of a rectangular flat plate portion, and the thickness of the entire pack can be reduced according to thickness reduction of a battery assembly since the protection circuit substrate is held substantially parallel to a flat surface of the cell.

Another object of the present invention is to provide a battery pack which has no superposition portion of a label and realizes a preferable appearance since a label is attached or wrapped so as to close an opening of a case and reach a side plate portion.

Another object of the present invention is to provide a battery pack with which the thickness can be equal to or smaller than the thickness of an existing pack wherein a label is wrapped on whole circumference of a cell, since the thickness of a flat plate portion of a case is equal to or smaller than 0.3 mm.

A battery pack according to the first aspect comprising: a battery assembly in which a protection circuit substrate having an output terminal is laid on one side face of a cell having a shape of a rectangular parallelepiped; a case for holding the battery assembly; and a label for covering a part or whole of the battery assembly and the case, characterized in that the case has a rectangular plate portion, side plate portions provided on three sides of the plate portion and a substrate casing portion which is provided on other one side of the plate portion, for holding the protection circuit substrate, and the substrate casing portion has a window portion, from which the output terminal is exposed.

With the present invention wherein a case is made by providing a substrate casing portion in an extension to a box member formed in an integrated manner, the accuracy of dimension of a battery pack, which becomes substantially equal to the accuracy of dimension of the case made of a single component, is enhanced in comparison with a battery pack having a case made of a plurality of components. Moreover, since the case is a box member formed in an integrated manner, the assembly man-hour can be significantly reduced and the invention becomes free from the problem described above, which is caused when two cases are assembled, such as a limitation of thickness reduction of a battery pack, a defective appearance and the potential of disassembly of a case.

Furthermore, since the protection circuit substrate is held and disposed substantially parallel to the flat surface of the cell in the present invention, electronic components can be mounted and output terminals can be provided on the protection circuit substrate without problems even when the thickness of the cell is reduced, and the thickness of the battery pack can be reduced.

A battery pack according to the second aspect is the battery pack according to the first aspect, characterized in that a height of the substrate casing portion is lower than a height of a side plate portion where the substrate casing portion is provided.

With the present invention wherein the vertical dimension of the substrate casing portion is shorter than the vertical dimension of the side plate portion, the protection circuit substrate is retained stable in the substrate casing portion and displacement of the battery assembly from the case is prevented.

A battery pack according to the third aspect is the battery pack according to the first or second aspect, characterized in that the bottom face of the substrate casing portion and the plate portion of the case are continuous in one plane.

With the present invention wherein the bottom face of the substrate casing portion is in the same plane as the plate portion and the window portion from which the output terminal is exposed exists at the bottom face of the battery pack, the shape of a portion of an outer device for housing the battery pack becomes simple and taking out and in of electric power becomes easy.

A battery pack according to the fourth aspect is the battery pack according to any one of the first to third aspects, characterized in that a height dimension of the side plate portions of the case and a thickness dimension of the battery assembly are substantially equal and the label covers an opening of the case as well as a part or whole of a side plate portion.

With the present invention wherein the case is a box member having side plate portions disposed on the circumference of the plate portion, it is unnecessary to attach or wrap the label on whole circumference of the plate portion and all that is needed is that the label which is covering the exposed face of the battery assembly reaches the side plate portion of the case or reaches the plate portion via the side plate portion. Accordingly, there is no superposition portion of the label and the appearance of the battery pack is not degraded.

A battery pack according to the fifth aspect is the battery pack according to the fourth aspect, characterized in that an end portion of the label is located at the side plate portion.

With the present invention, the rear face of the battery pack is only the case and a preferable appearance of the battery pack is realized.

A battery pack according to the sixth aspect is the battery pack according to any one of the first to fifth aspects, characterized in that a thickness of the plate portion of the case is equal to or smaller than 0.3 mm.

Since the thickness of the label is 0.1-0.15 mm and the thickness of the case in the present invention is equal to or smaller than 0.3 mm, the thickness of the case becomes substantially equal to or smaller than the thickness of two sheets of the label and the thickness of the battery pack can be substantially equal to or smaller than the thickness of an existing pack made by wrapping a label on whole circumference.

A battery pack according to the seventh aspect is the battery pack according to any one of the first to sixth aspects, characterized in that the substrate casing portion has a rib for inhibiting a vertical motion of the protection circuit substrate.

With the present invention, the output terminal provided at the protection circuit substrate can be retained stable.

A battery pack according to the eighth aspect is the battery pack according to any one of the first to seventh aspects, characterized in that the substrate casing portion has a rib for inhibiting in-plane motion of the protection circuit substrate.

With the present invention, the protection circuit substrate can be retained stable.

The above and further objects and features of the invention will more fully be apparent from the following detailed description with accompanying drawings.

DETAILED DESCRIPTION OF THE INVENTION

The following description will explain the present invention in detail with reference to the drawings illustrating some embodiments thereof.

Embodiment 1

Figure 1:
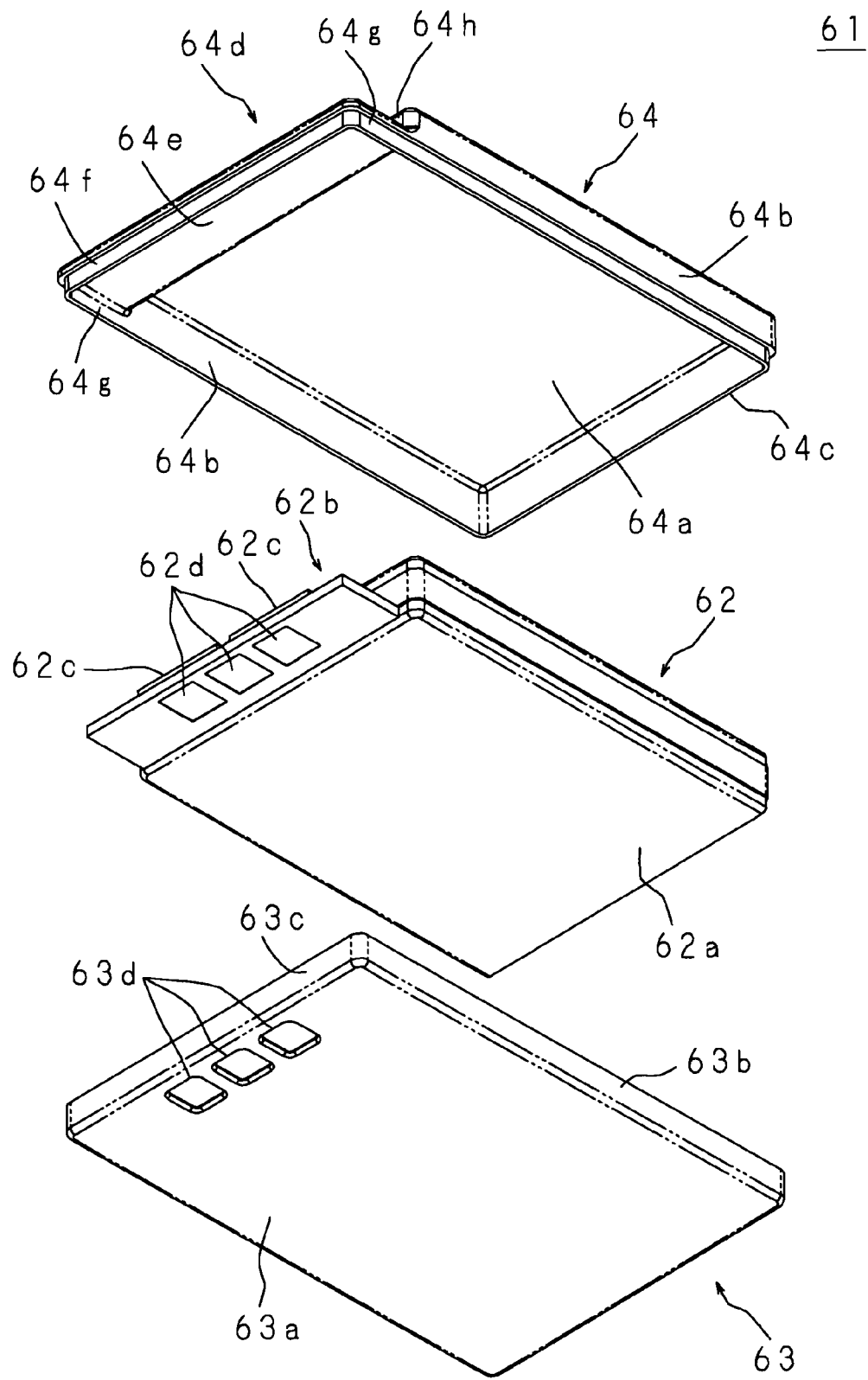
FIG. 1 is an exploded perspective view showing the same battery pack as that of Japanese Patent Application Laid-Open No. 2005-190852.
Figure 2:
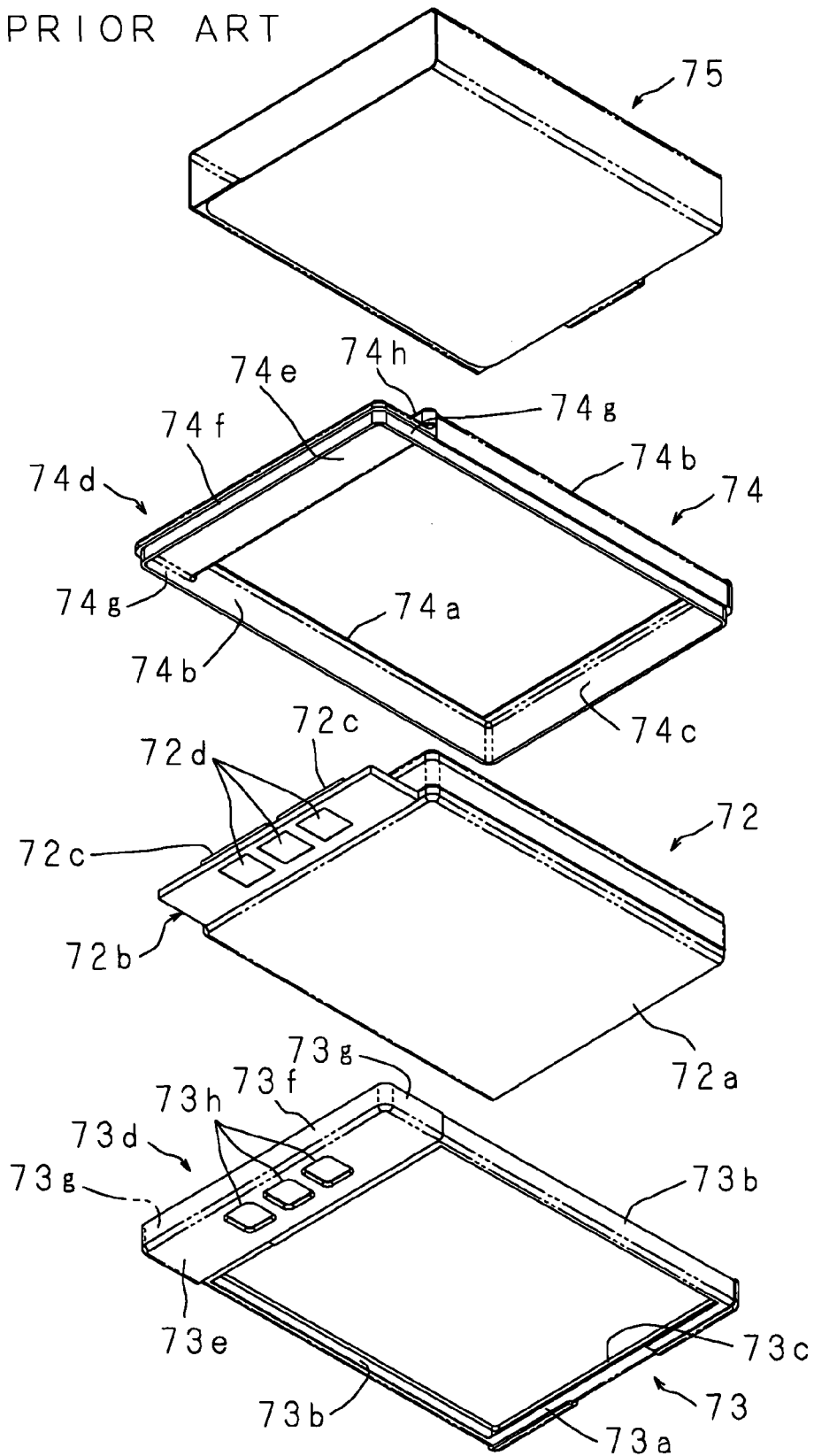
FIG. 2 is an exploded perspective view showing the same battery pack as that of Japanese Patent Application Laid-Open No. 2005-100689.
Figure 3:
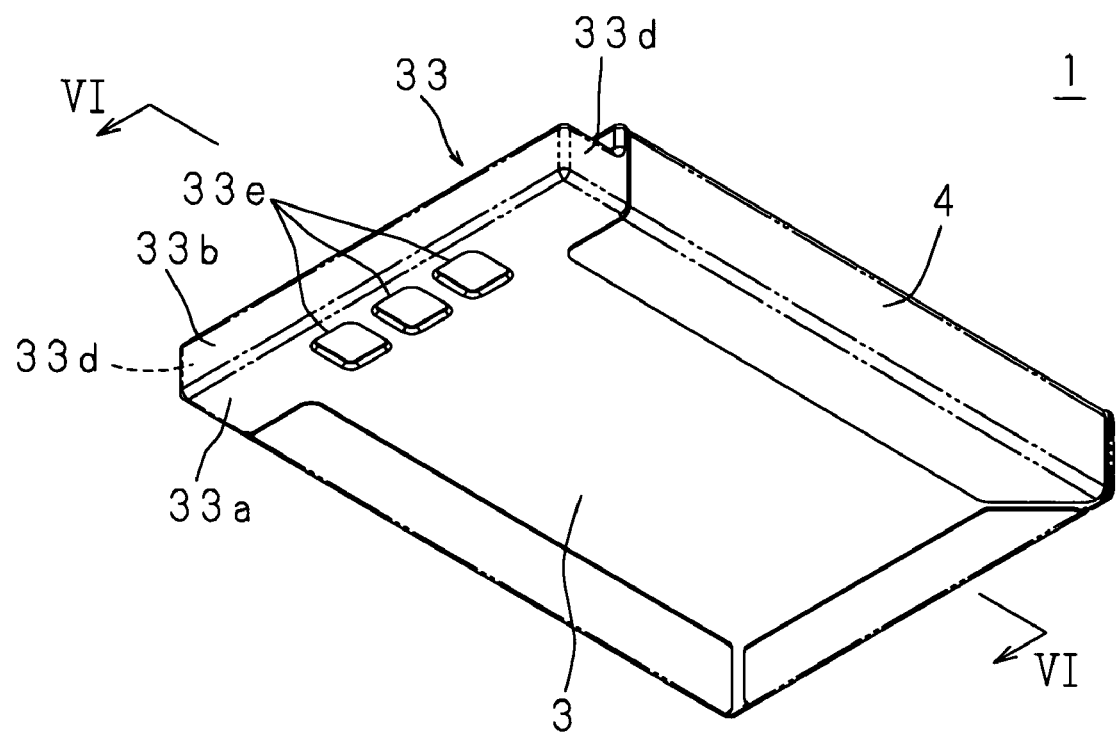
FIG. 3 is a perspective view showing a battery pack according to Embodiment 1 of the present invention.
Figure 4:
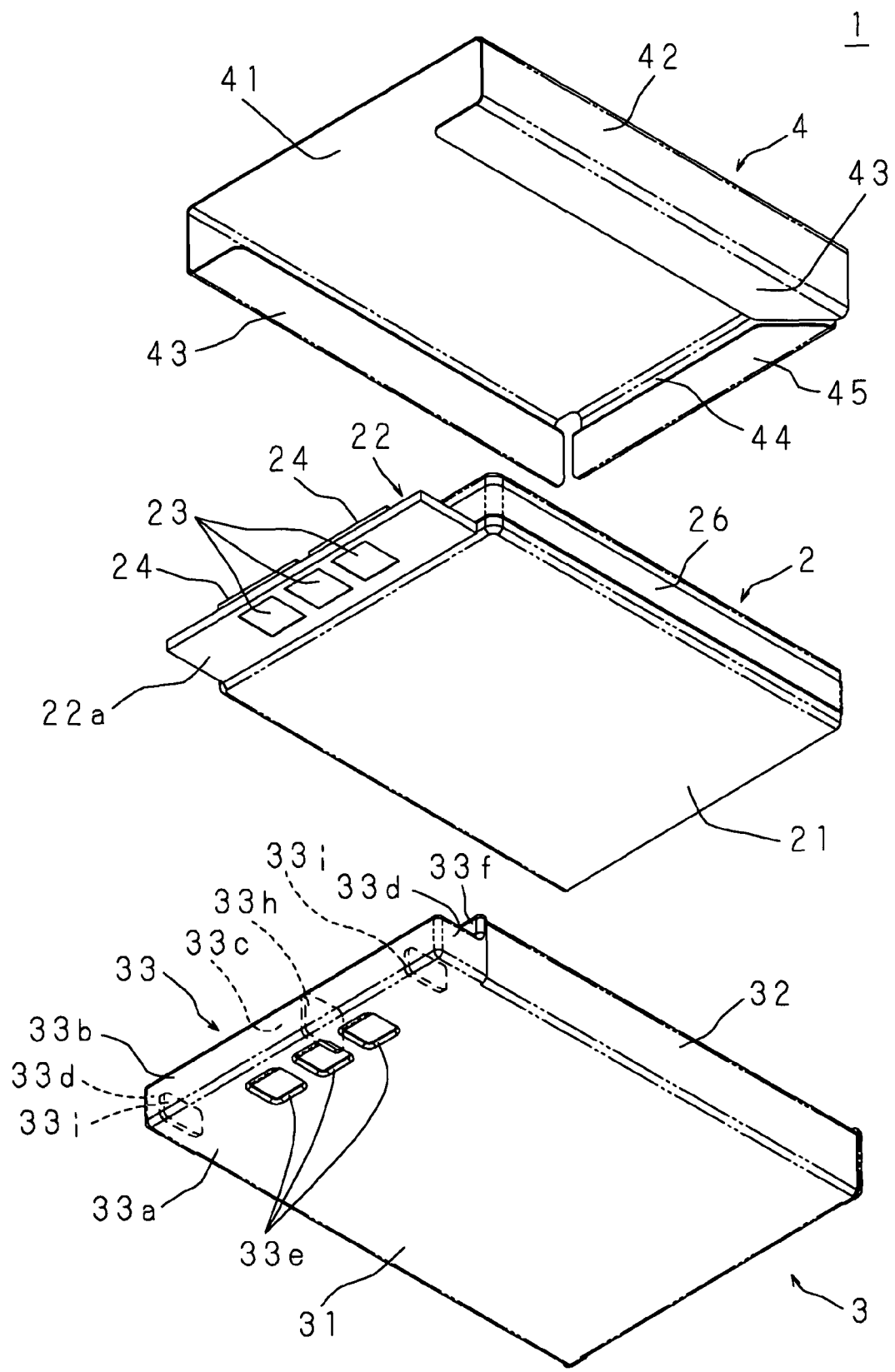
FIG. 4 is an exploded perspective view showing the battery pack according to Embodiment 1 seen from the rear side.
Figure 5:
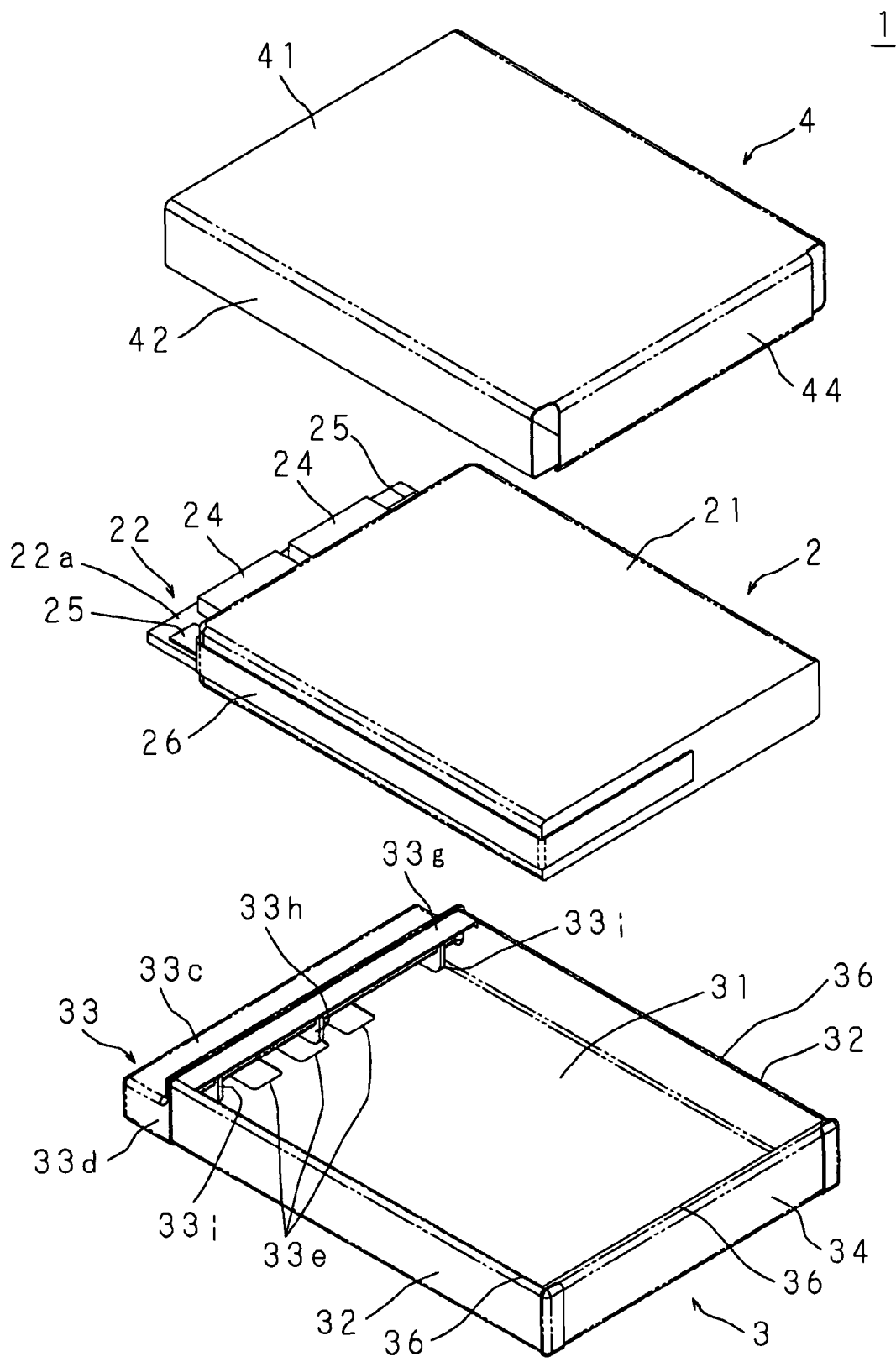
FIG. 5 is an exploded perspective view showing the battery pack according to Embodiment 1 seen from the top side.
Figure 6:
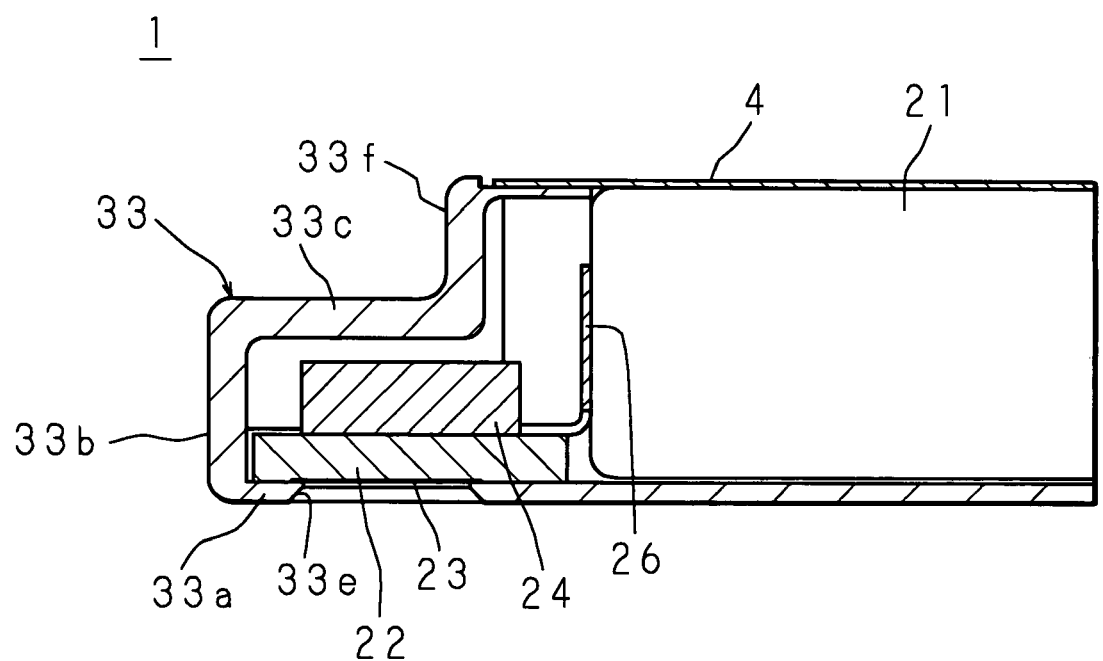
FIG. 6 is a sectional view along the line VI-VI in FIG. 3.

FIG. 3 is a perspective view showing a battery pack 1 according to Embodiment 1 of the present invention; FIG. 4 is an exploded perspective view showing the battery pack 1 seen from the rear side; FIG. 5 is an exploded perspective view showing the battery pack 1 seen from the top side; and FIG. 6 is a sectional view along the line VI-VI in FIG. 3.

A cell 21 of a battery assembly 2 of the battery pack 1 is a nonaqueous electrolyte secondary battery, such as a lithium-ion secondary battery, having the shape of a square flat plate and is made by holding electrode assembly comprising a positive electrode and a negative electrode wound via a separator and nonaqueous electrolyte in a case made of aluminum or aluminum alloy.

The battery assembly 2 is constructed by laying down a protection circuit substrate 22 on one end face of the cell 21. The top face of a substrate 22a of the protection circuit substrate 22 is provided with protection circuits 24 and 24 for preventing overcharge, overdischarge or the like and is connected with positive and negative electrode plates 25 and 25, which are connected with the cell 21 respectively via lead plates 26 and 26. Output terminals 23, 23 and 23 for taking out electric power to the outside as well as taking in electric power from the outside for charge are provided at the rear face of the substrate 22a in a form of gold plating.

A case 3 is made of synthetic resin and manufactured in an integrated manner by molding. An example of the synthetic resin is PC (polycarbonate). The case 3 is made by disposing side plate portions 32 and 32 on the long side and a side plate portion 34 on one short side on the circumference of a flat plate portion 31. Provided on the other short side of the case 3 in two tiers are a side plate portion 33f and a substrate casing portion 33 which has a height lower than the side plate portion 33f and protrudes in the longitudinal direction of the case 3. The substrate casing portion 33 comprises a lower plate portion 33a, side plate portions 33b, 33d and 33d, and an upper plate portion 33c.

The thickness of the flat plate portion 31 is equal to or smaller than 0.3 mm. The height dimension of the side plate portions 32, 32, 34 and 33f is substantially equal to the thickness dimension of the battery assembly 2.

The lower plate portion 33a is provided in an extension to the flat plate portion 31 and is provided with window portions 33e, 33e and 33e from which the output terminals 23, 23 and 23 are exposed.

A rib 33h for supporting the protection circuit substrate 22 is provided vertically at a substantially center portion of the upper plate portion 33c and ribs 33i and 33i for inhibiting in-plane motion of the protection circuit substrate 22 are provided on both end sides of the lower plate portion 33a.

Each upper portion of the side plate portions 32, 32 and 34 is provided with a limb portion 36, and a hood portion 33g having a width larger than any limb portion 36 is laid on an upper end of the side plate portion 33f.

Since the case 3 is constructed as described and formed in an integrated manner, the assembly man-hour of the battery pack 1 is significantly reduced.

A label 4 comprises: a rectangular flat surface portion 41; side portions 42 and 42 on the long side; folded end portions 43 and 43 provided in an extension to the side portions 42 and 42; a back portion 44; and a folded end portion 45 provided in an extension to the back portion 44.

In the battery pack 1 of the present embodiment, the battery assembly 2 is held in the case 3 by fitting the protection circuit substrate 22 into the substrate casing portion 33 with the protection circuit substrate 22 being fitted between the ribs 33i and 33i.

Since the top face of the protection circuit substrate 22 is supported by the rib 33h and the output terminals 23, 23 and 23 provided on the rear face are supported, the output terminals 23, 23 and 23 are retained stable in the substrate casing portion 33. The output terminals 23, 23 and 23 of the protection circuit substrate 22 are exposed from the window portions 33e, 33e and 33e.

After the battery assembly 2 is incorporated in the case 3, the label 4 is wrapped around the battery assembly 2 and the case 3 by attaching the flat surface portion 41 of the label 4 to the top face of the cell 21, fitting the side portions 42 and 42 along the side plate portions 32 and 32 of the case 3, attaching the folded end portions 43 and 43 along end portions of the rear face of the flat plate portion 31, further fitting the back portion 44 along the side plate portion 34 and attaching the folded end portion 45 along an end portion of the flat plate portion 31.

With the present embodiment wherein the case 3 is constructed by providing the substrate casing portion 33 in an extension to a box member formed in an integrated manner, the accuracy of dimension of the battery pack 1, which becomes substantially equal to the accuracy of dimension of the case 3 made of a single component, is enhanced in comparison with a battery pack having a case made of a plurality of components.

Moreover, with the present embodiment, the protection circuit substrate 22 can be retained stable at a fixed position in the substrate casing portion 33, and the battery assembly 2 can be held in the case 3 without displacement of the battery assembly 2 and the case 3 or slipping out of the battery assembly 2 from the case 3.

Furthermore, with the present embodiment wherein the protection circuit substrate 22 is held and disposed substantially parallel to the flat surface of the cell 21, electronic components can be mounted and the output terminals 23, 23 and 23 can be provided on the protection circuit substrate 22 without problems even when the thickness of the cell 21 is reduced.

Embodiment 2

Figure 7:
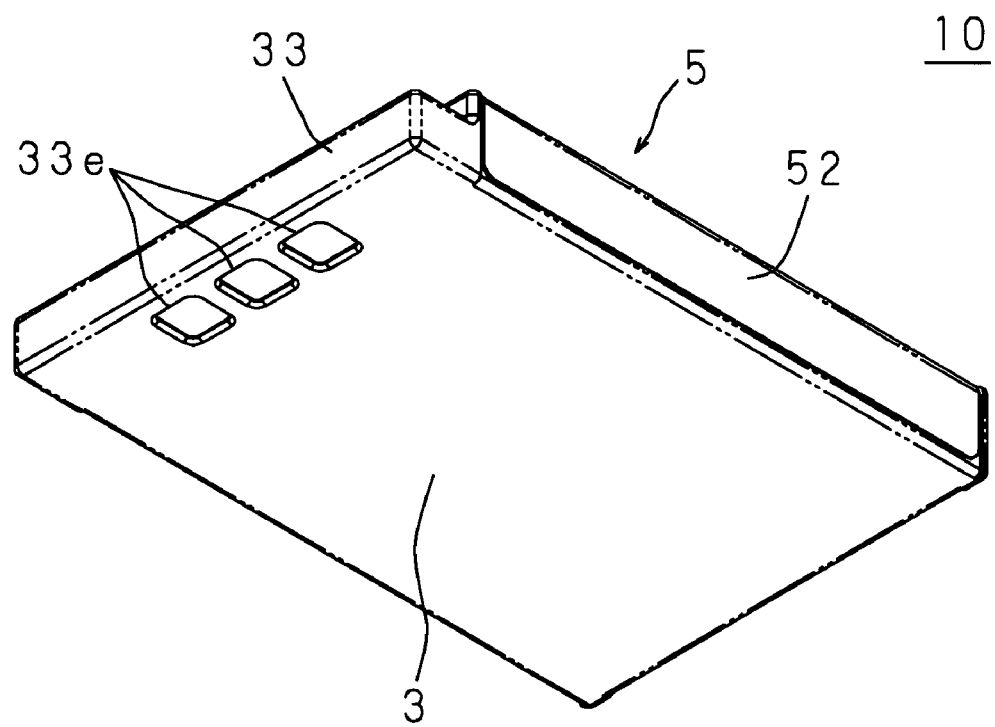
FIG. 7 is a perspective view showing a battery pack according to Embodiment 2 of the present invention.
Figure 8:
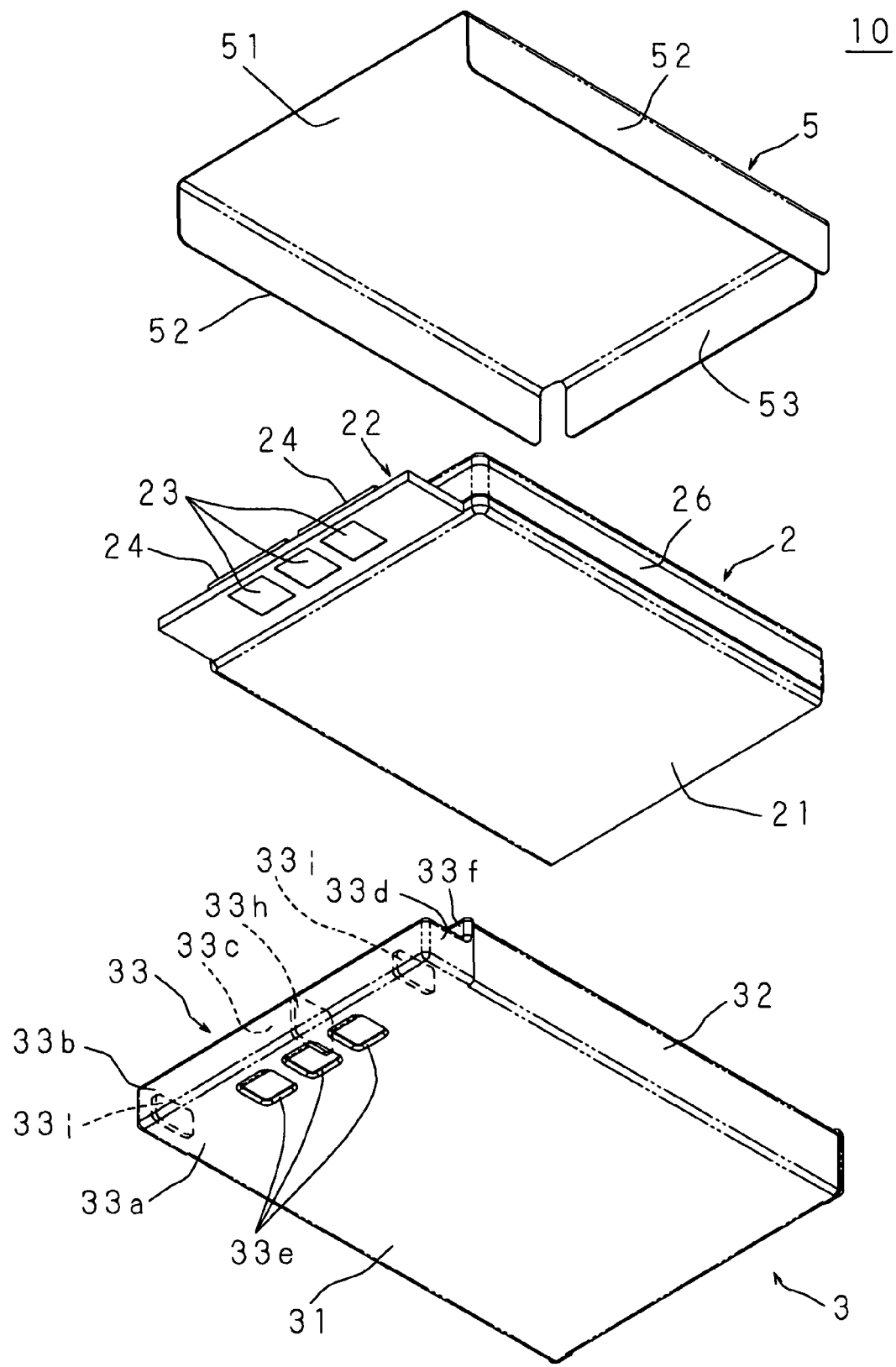
FIG. 8 is an exploded perspective view showing the battery pack according to Embodiment 2 seen from the rear side.

FIG. 7 is a perspective view showing a battery pack 10 according to Embodiment 2 of the present invention; and FIG. 8 is an exploded perspective view showing the battery pack 10 seen from the rear side. Like codes are used in the figures to refer to like parts of the battery pack in FIG. 3.

The thickness of the flat plate portion 31 of the case 3 of the battery pack 10 is 0.25 mm.

A label 5 of the battery pack 10 comprises a rectangular flat surface portion 51, side portions 52 and 52 on the long side and a back portion 53. The label 5 does not have the folded end portions 43 and 45 of the label 4.

In the present embodiment, after the battery assembly 2 is incorporated in the case 3, the flat surface portion 51 of the label 5 is attached to the top face of the cell 21, the side portions 52 and 52 are fitted along the side plate portions 32 and 32 of the case 3, and further, the back portion 53 is attached along the side plate portion 34 like Embodiment 1.

As described above, the label 5 in the present embodiment is attached so that an end portion is located at the side plate portions 32, 32 and 34 of the case 3.

Since the case 3 is a box member, it is unnecessary to attach the label 5 on whole circumference of the battery assembly 2 and the case 3, and all that is needed is that the label 5, which is covering the top face of the battery assembly 2, reaches the side plate portions 32, 32 and 34 of the case 3. Accordingly, there is no superposition portion of the label 5 and the battery pack 10 has a preferable appearance.

Moreover, the thickness of the flat plate portion 31 is 0.25 mm, which is thinner than the thickness of two superposed sheets of the label 5 having a thickness of approximately 0.13 mm. Accordingly, the thickness of the battery pack 10 can be thinner than the thickness of an existing battery pack made by wrapping a label on whole circumference and superposing the label on the rear face of the battery assembly.

It should be noted that the thickness of the flat plate portion 31 and the label 5 is not limited to the one mentioned above, and various kinds of design change, such as setting the thickness of the flat plate portion 31 to 0.2 mm when the thickness of the label 5 is approximately 0.1 mm, can be made. Since the thickness of the label is approximately 0.1-0.15 mm, the thickness of the flat plate portion 31 should be equal to or smaller than double the thickness of the label 5.

Embodiment 3

Figure 9:
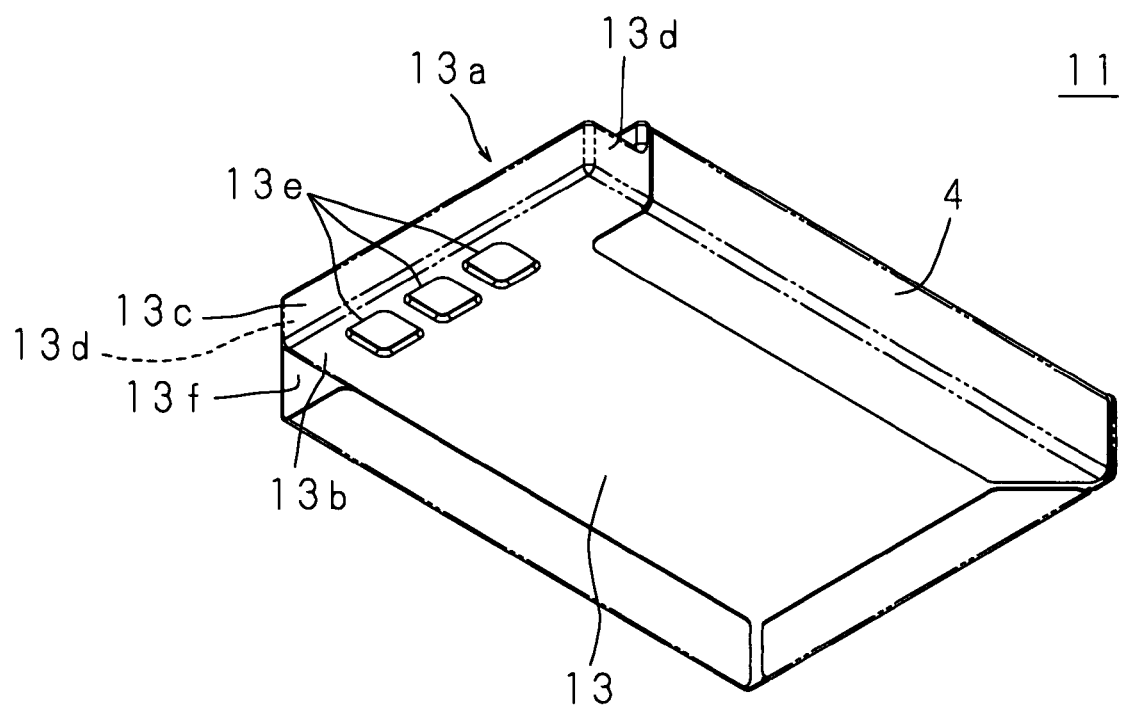
FIG. 9 is a perspective view showing a battery pack according to Embodiment 3 of the present invention.

FIG. 9 is a perspective view showing a battery pack 11 according to Embodiment 3 of the present invention.

Provided on one short side of a case 13 of the battery pack 11 are a side plate portion 13f and a substrate casing portion 13a which has a height lower than the side plate portion 13f and a width narrower than the side plate portion 13f in the longitudinal direction and protrudes from the side plate portion 13f. The substrate casing portion 13a comprises a lower plate portion 13b, side plate portions 13c, 13d and 13d and an upper plate portion (not illustrated).

The width of the substrate casing portion 13a in the longitudinal direction is substantially equal to the width in the longitudinal direction of the protection circuit substrate of the battery assembly.

With the present embodiment wherein the width of the substrate casing portion 13a in the longitudinal direction is substantially equal to the width of the protection circuit substrate in the longitudinal direction, the protection circuit substrate can be retained stable at a fixed position in the substrate casing portion 13a like the battery pack 1 in Embodiment 1 even without providing the ribs 33i and 33i at the substrate casing portion 33, and the battery assembly is fixed in the case 13 and does not slip out of the case 13.

Embodiment 4

Figure 10:
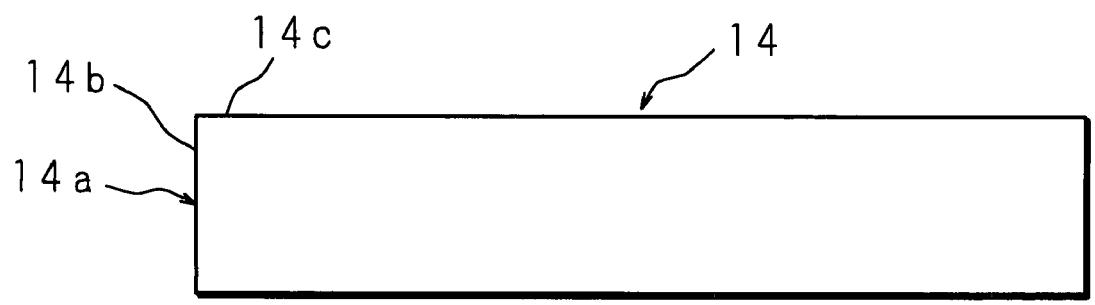
FIG. 10 is a side view showing a case of a battery pack according to Embodiment 4 of the present invention.

FIG. 10 is a side view showing a case 14 of a battery pack according to Embodiment 4 of the present invention.

Provided on one side of the case 14 having the shape of a box member is a substrate casing portion 14a. The vertical dimension of a side plate portion 14b of the substrate casing portion 14a is equal to the vertical dimension of the other side plate portions of the case 14. An upper plate portion 14c which extends inward in a direction perpendicular to the side plate portion 14b so as to cover a held protection circuit substrate is provided in an extension to the upper end portion of the side plate portion 14b.

In the present embodiment, it is preferable to provide a rib at the upper plate portion 14c for supporting output terminals of the protection circuit substrate from an opposite face to a face where the output terminals are provided. It is also preferable to provide a rib for inhibiting in-plane motion of the protection circuit substrate vertically at the upper plate portion 14c or on a lower face or continuously from the upper plate portion 14c to the lower face.

Embodiment 5

Figure 11:
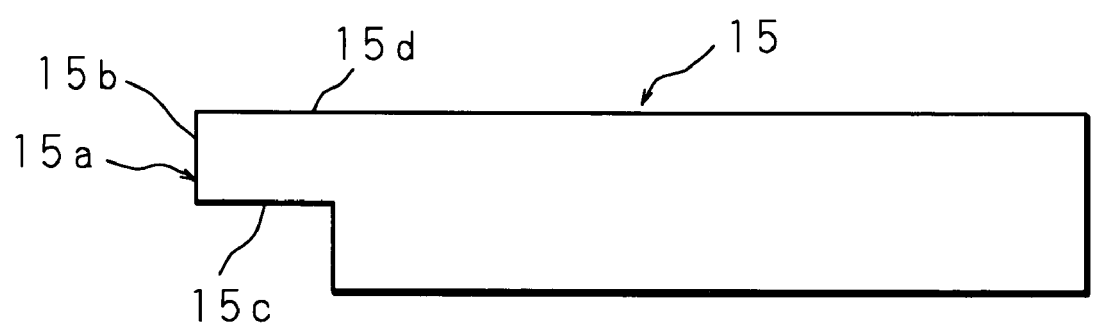
FIG. 11 is a side view showing a case of a battery pack according to Embodiment 5 of the present invention.

FIG. 11 is a side view showing a case 15 of a battery pack according to Embodiment 5 of the present invention.

Provided at an upper portion of one side of the case 15 having the shape of a box member is a substrate casing portion 15a. The vertical dimension of the side plate portion 15b of the substrate casing portion 15a is shorter than the vertical dimension of the other side plate portions of the case 15 and the height of a lower plate portion 15c is higher than a flat plate portion of the case 15. An upper plate portion 15d which extends inward in a direction perpendicular to the side plate portion 15b so as to cover a held protection circuit substrate is provided in an extension to the upper end portion of the side plate portion 15b.

In the present embodiment, it is preferable to provide a rib at the upper plate portion 15d for supporting output terminals of the protection circuit substrate from an opposite face to a face where the output terminals are provided. It is also preferable to provide a rib for inhibiting in-plane motion of the protection circuit substrate vertically at the upper plate portion 15d or on the lower plate portion 15c or continuously from the upper plate portion 15d to the lower plate portion 15c.

Embodiment 6

Figure 12:
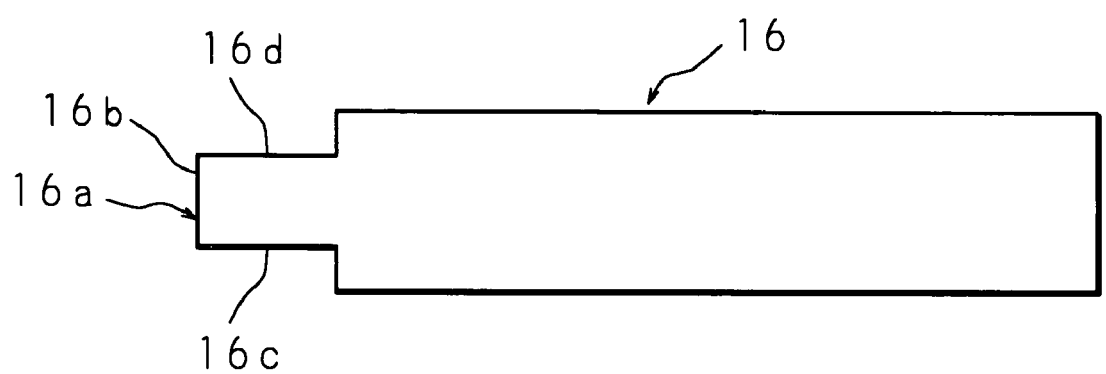
FIG. 12 is a side view showing a case of a battery pack according to Embodiment 6 of the present invention.

FIG. 12 is a side view showing a case 16 of a battery pack according to Embodiment 6 of the present invention.

Provided at a substantially center portion of one side of the case 16 having the shape of a box member is a substrate casing portion 16a. The vertical dimension of a side plate portion 16b of the substrate casing portion 16a is shorter than the vertical dimension of the other side plate portions of the case 16. The height of a lower plate portion 16c is higher than the height of a flat plate portion of the case 16 and the height of an upper plate portion 16d is lower than the height of an opening plane of the case 16.

In the present embodiment, it is preferable to provide a rib at the upper plate portion 16d for supporting output terminals of a protection circuit substrate from an opposite face to a face where the output terminals are provided. It is also preferable to provide a rib for inhibiting in-plane motion of the protection circuit substrate vertically at the upper plate portion 16d or on the lower plate portion 16c or continuously from the upper plate portion 16d to the lower plate portion 16c.

Embodiment 7

Figure 13:
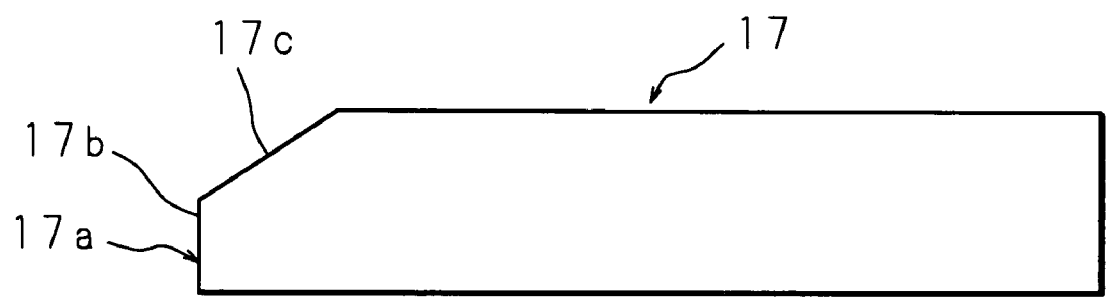
FIG. 13 is a side view showing a case of a battery pack according to Embodiment 7 of the present invention.

FIG. 13 is a side view showing a case 17 of a battery pack according to Embodiment 7 of the present invention.

Provided on one side of the case 17 is a substrate casing portion 17a. The vertical dimension of a side plate portion 17b of the substrate casing portion 17a is shorter than the vertical dimension of the other side plate portions of the case 17 and an upper plate portion 17c of the substrate casing portion 17a is provided at a slant.

In the present embodiment, it is preferable to provide a rib at the upper plate portion 17c for supporting output terminals of a protection circuit substrate from an opposite face to a face where the output terminals are provided. It is also preferable to provide a rib for inhibiting in-plane motion of the protection circuit substrate vertically at the upper plate portion 17c or on a lower face or continuously from the upper plate portion 17c to the lower face.

It should be noted that the upper plate portion 17c may have the shape of an arc seen from the side face.

Various kinds of design change can be made for a case of a battery pack according to the present invention to suit the position of the output terminals in the battery pack or the like. For example, a side plate portion may be a slope when a portion where a substrate casing portion is provided in a stepped manner.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A battery pack comprising:
   a battery assembly in which a protection circuit substrate having an output terminal is laid on one side face of a cell having a shape of a rectangular parallelepiped;
   a case for holding the battery assembly; and
   a label for covering a part or whole of the battery assembly and the case,
   wherein the case comprises a rectangular plane plate portion, two opposed side plate portions and a further side plate portion, provided on three sides of the plane plate portion and a substrate casing portion which is provided on another side of the plane plate portion opposite the further side plate portion, for casing the protection circuit substrate, and
   the substrate casing portion has five faces with which two plane faces and three side faces of the protection circuit substrate are covered, is obtained by molding with the remainder of the case in an integrated manner, and has a window portion from which the output terminal is exposed.

2. The battery pack according to claim 1, wherein a height of the substrate casing portion is lower than a height of the another side where the substrate casing portion is provided.

3. The battery pack according to claim 1, wherein a bottom face of the substrate casing portion and the plane plate portion of the case are continuous in one plane.

4. The battery pack according to claim 1, wherein a height dimension of the side plate portions of the case and a thickness dimension of the battery assembly are substantially equal, and the label covers an opening of the case as well as a part or whole of a side plate portion.

5. The battery pack according to claim 1, wherein a thickness of the plate portion of the case is equal to or smaller than 0.3 mm.

6. The battery pack according to claim 1, wherein the substrate casing portion has a rib for inhibiting vertical motion of the protection circuit substrate.

7. The battery pack according to claim 1, wherein the substrate casing portion has a rib for inhibiting in-plane motion of the protection circuit substrate.

8. The battery pack according to claim 1, wherein a height of the substrate casing portion is lower than a height of the another side where the substrate casing portion is provided,
   a bottom face of the substrate casing portion and the plate portion of the case are continuous in one plane,
   a height dimension of the side plate portions of the case and a thickness dimension of the battery assembly are substantially equal, and
   the label covers an opening of the case as well as a part or whole of a side plate portion.

9. The battery pack according to claim 1, wherein a height of the substrate casing portion is lower than a height of the another side where the substrate casing portion is provided,
   a bottom face of the substrate casing portion and the plate portion of the case are continuous in one plane,
   a height dimension of the side plate portions of the case and a thickness dimension of the battery assembly are substantially equal,
   a thickness of the plate portion of the case is equal to or smaller than 0.3 mm, and
   the label covers an opening of the case as well as a part or whole of a side plate portion.

10. The battery pack according to claim 1, wherein a height of the substrate casing portion is lower than a height of the another side where the substrate casing portion is provided,
    a bottom face of the substrate casing portion and the plate portion of the case are continuous in one plane,
    a height dimension of the side plate portions of the case and a thickness dimension of the battery assembly are substantially equal,
    the substrate casing portion has a rib for inhibiting a vertical motion of the protection circuit substrate, and
    the label covers an opening of the case as well as a part or whole of a side plate portion.

11. The battery pack according to claim 1, wherein a height of the substrate casing portion is lower than a height of the another side where the substrate casing portion is provided,
    a bottom face of the substrate casing portion and the plate portion of the case are continuous in one plane,
    a height dimension of the side plate portions of the case and a thickness dimension of the battery assembly are substantially equal,
    a thickness of the plate portion of the case is equal to or smaller than 0.3 mm,
    the substrate casing portion has a rib for inhibiting a vertical motion of the protection circuit substrate, and
    the label covers an opening of the case as well as a part or whole of a side plate portion.

12. The battery pack according to claim 1, wherein a height of the substrate casing portion is lower than a height of the another side where the substrate casing portion is provided,
    a bottom face of the substrate casing portion and the plate portion of the case are continuous in one plane,
    a height dimension of the side plate portions of the case and a thickness dimension of the battery assembly are substantially equal,
    a thickness of the plate portion of the case is equal to or smaller than 0.3 mm,
    the substrate casing portion has a rib for inhibiting in-plane motion of the protection circuit substrate, and
    the label covers an opening of the case as well as a part or whole of a side plate portion.

13. The battery pack according to claim 1, wherein a height of the substrate casing portion is lower than a height of the another side where the substrate casing portion is provided,
    a bottom face of the substrate casing portion and the plate portion of the case are continuous in one plane,
    a height dimension of the side plate portions of the case and a thickness dimension of the battery assembly are substantially equal,
    a thickness of the plate portion of the case is equal to or smaller than 0.3 mm, the substrate casing portion has a rib for inhibiting a vertical motion of the protection circuit substrate, and a rib for inhibiting in-plane motion of the protection circuit substrate, and the label covers an opening of the case as well as a part or whole of a side plate portion.

* * * * *